H. A. SELAH.
ROTARY METER.
APPLICATION FILED JAN. 20, 1910.
1,009,934.
Patented Nov. 28, 1911.
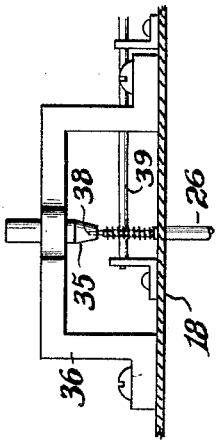
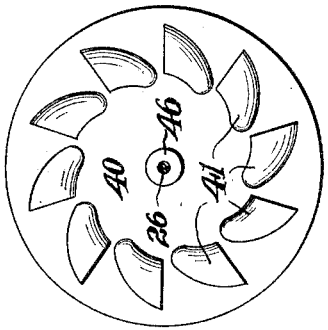
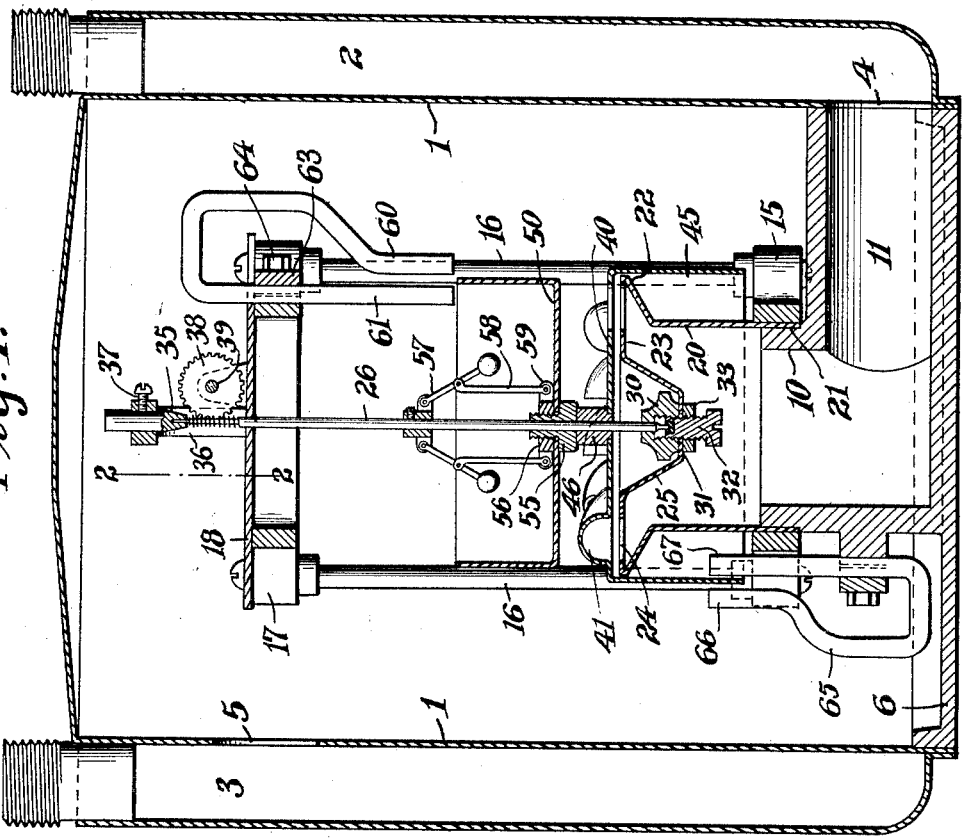
WITNESSES:
Daniel Webster, Jr.
Carrie E. Kleinfelder
INVENTOR
Howard A. Selah
BY
Cyrus N. Anderson
ATTORNEY.
COLUMBIA PLANOGRAPH CO., WASHINGTON, D. C.

UNITED STATES PATENT OFFICE.

HOWARD A. SELAH, OF PHILADELPHIA, PENNSYLVANIA, ASSIGNOR TO CYRUS N. ANDERSON, TRUSTEE, OF PHILADELPHIA, PENNSYLVANIA.

ROTARY METER.

1,009,934. Specification of Letters Patent. Patented Nov. 28, 1911.

Application filed January 20, 1910. Serial No. 539,100.

*To all whom it may concern:*

Be it known that I, HOWARD A. SELAH, a citizen of the United States, residing in Philadelphia, county of Philadelphia, State of Pennsylvania, have invented certain new and useful Improvements in Rotary Meters, of which the following is a specification.

Broadly considered my invention has relation to meters generally but more specifically it relates to meters of the rotary type and in which means is provided for controlling and modifying the operation of certain of the parts which enter into the construction.

One of the objects of my invention is to provide means which will prevent a meter of the rotary type from inaccurate registration or measurement.

While my said invention, as illustrated in the drawings, is primarily and particularly designed for use in connection with a meter for measuring gas or a similar fluid, it is to be understood that the principle disclosed and illustrated is applicable to a meter employed to register or measure the quantity of electric current which may be used or consumed by a user or consumer.

Another object of my invention is to provide means whereby a rotary meter of the general character illustrated may be employed for the measuring of gas when the same is used in relatively small quantities, as, for instance, the supplying of a sufficient quantity of gas used by a single burner. Heretofore, so far as I am aware, it has been impracticable to employ a rotary meter for the measuring of gas where a relatively small quantity only was used, as, for instance, a quantity necessary to supply a single burner. This has been due to the fact that as heretofore constructed such meters have not been provided with means to cause them to discontinue their operation immediately upon shutting off the gas from a burner or other consuming device.

Another object of my invention is to provide a meter which from an operative standpoint will, in usage, possess a high degree of efficiency and effectiveness and which structurally considered will be of the greatest possible simplicity consonant with the ends to be obtained, being composed of but few parts all of which are adapted to be made at a minimum of cost and individually so formed as to be capable of being readily assembled in a neat and compact arrangement for accomplishing the purpose intended. Other objects and advantages will become apparent from the detailed description of my invention which follows.

With these and other ends in view this invention consists in the features of construction, combination of parts and arrangement of elements hereinafter more fully set forth as an exemplification of the underlying principles involved in my invention.

In order that my invention may be more fully and readily understood by others skilled in the arts to which it relates, drawings illustrating a convenient means for carrying out the said invention are appended as a part of this specification, and while the controlling principle of invention may be illustrated by modified constructions falling within the scope of the claims, the hereinafter disclosed embodiment is that which ordinarily will be preferred in practice and is regarded as representing the best form or embodiment of my invention.

In the drawings:—Figure 1 is a vertical longitudinal section of a meter embodying my invention, the said meter being inclosed within a closed receptacle; Fig. 2 is a view on the line 2—2 illustrating a detail of construction; and Fig. 3 is a top plan view of a member rotatable by the action of the gas impinging upon portions of the same as it passes through the meter.

Referring to the drawings:—1 designates an inclosing casing; 2 designates a conduit forming a passage-way through which the gas or other fluid passes to the said meter and into the casing 1; and 3 designates a passage-way through which the gas or similar fluid escapes from the said meter and its casing. It will be understood that the gas may be received from any usual source and that it may be conducted to any point desirable after it leaves the meter. In the construction shown the gas enters the casing 1 at its bottom portion through an opening 4 and leaves the casing 1 through an opening 5 at its upper portion. The casing is mounted upon a base 6 and extends around and over the same, as indicated, and is soldered or otherwise fastened thereto in such manner as to form an air-tight connection.

10 designates a tubular boss which, in the construction shown, is formed upon the upper surface of the base 1 and has communication with the supply conduit 2 through a passage-way or conduit 11. Supported upon the upper end of the tubular boss 10 is a frame-like structure having a base portion 15 and the upright posts or standards 16 on which a frame-like top member 17 is supported as well as a top plate 18.

20 designates a casing (shown as tubular), the lower end of which is located inside of the base portion 15 and is adapted to extend over the upper end of the tubular boss 10 as is clearly indicated at 21 in Fig. 1 of the drawings. The upper end portion of the casing 20 is flared or expanded as indicated at 22 in Fig. 1 of the drawings and is provided with a top or cover plate 23 having perforations 24. The central portion of the cover plate 23 is depressed, as indicated at 25, to form a support for the supporting members of a vertical shaft 26. The supporting members comprise a member 30 which rests upon the upper side of a horizontal portion 31 of the depressed supporting portion of the cover plate. The lower end of the shaft 26 rests upon a jewel fitted in the upper end of an adjustable member 32. The said adjustable member 32 has screw-threaded connection with a clamping nut 33 located at the lower side of the horizontal portion 31. The part 32 has screw-threaded connection with the parts 30 and 33. By turning the part 32 it may be adjusted up or down as desired. The upper end of the shaft 26 is supported and works in an adjustable bearing 35, which bearing is supported in the upper cross bar of a U-shaped bracket 36 which is secured to and supported upon the plate 18. The bearing 35 is held in adjusted position by means of a binding screw 37. The upper end of the shaft 26 is provided with a worm which engages a gear wheel 38 on a shaft 39 which extends to the mechanism of a meter index (not shown) to drive the same.

40 designates a turbine plate having vanes 41 circularly arranged and located toward the outer edge of the plate on which they are formed. These vanes are inclined upwardly from the plane of the plate 40. The outer edge of each of these vanes is curved and each curved edge is eccentrically located with respect to the center of the turbine plate 40. The inner edge of each of the said vanes is similarly located. The said vanes are eccentrically located with respect to the center of the plate of the turbine and may be said to be tangentially arranged with respect to a circle concentric with the center of said plate 40. The turbine plate 40 is provided with a downwardly extending flange or apron 45 as shown in Fig. 1 of the drawings. A block or plug 46 is secured to the central portion of the turbine plate 40 and is secured to the vertical shaft 26 which extends therethrough. In consequence of this the driving of the turbine causes revolution of the shaft 26. For the purpose of controlling the revolution of the turbine plate 40 and its connecting shaft, I have mounted a cup shaped member 50 upon the said shaft 26 above the turbine plate 40.

55 designates a screw-threaded bolt the head of which is located upon the lower side of the cup-like member 50. The said bolt extends through the bottom of the said member 50 and has screw-threaded connection with a nut 56. By screwing the bolt 55 into the nut 56 the said bolt and nut are firmly clamped to the member 50. The shaft 26 extends through the screw-threaded bolt 55 and is so connected thereto as to permit vertical movement of the said screw-threaded bolt and the cup-shaped member 50 secured thereto on the said shaft and at the same time cause the said member 50 to rotate with the said shaft.

Supported upon the shaft 26 is a ball governor 57 the arms of which are connected by means of links 58 to lugs or ears 59 on the nut 56. When the sped of rotation of the shaft 26 reaches a certain point which may be predetermined, the balls are drawn outwardly by the action of centrifugal force which action causes an upward movement of the cup 50 on the shaft 26.

Normally, as when the apparatus is not in operation, the upper edge of the cup 50 occupies a plane substantially flush with the lower ends of the poles 60 and 61 of a magnet 62 secured to one side of the frame 17. The said magnet is held in place by means of a clamping plate 63 which extends over one leg of the magnet and is secured by means of bolts 64 only one of which is shown. It is obvious that the magnet may be vertically adjusted. The magnet is bent so as to bring the poles 60 and 61 in juxtaposition with relation to each other, as is clearly shown in Fig. 1 of the drawings.

In the operation of the meter described herein and illustrated in the drawings, the gas or other similar fluid enters the meter through the conduit or passage-way 11 and in passing through the openings in the turbine plate 40 strikes the vanes 41 and occasions rotation of the turbine together with the parts connected thereto. It is very desirable that when the gas is first turned on and begins its passage through the meter the rotation of the said turbine should start as easily as possible. As soon, however, as rotation of the turbine and its connected parts once begins it is apt to rotate too rapidly. To obviate this difficulty I have provided the supplemental cup 50 which is adapted to be raised by means of the governor 57 so as to carry the sides of the cup upwardly between the poles 60 and 61 of the magnet 62. The said magnet operates to resist or retard the rotation of the said cup and its connected parts, including the shaft 26 and its turbine 40. The retardation or resistance varies in proportion to the number of lines of force cut by the wall of the said cup. In other words, the resistance increases in proportion as the cup is raised. In the position shown in which the upper edge of the cup is practically flush with the lower ends of the pole 60 and 61 of the magnet, the latter offers practically no resistance to the rotation of the cup and its connected parts. The magnet also acts to stop the rotation of the cup immediately upon the stopping of the flow of the gas.

The easy starting of the rotation of the parts when the gas is turned on and first begins its passage through the meter and the immediate cessation of rotation of the said parts when the passage of the gas is interrupted, are essential to the correct and accurate registration by the meter of the quantity of gas which passes through it.

It may be found that in addition to the controlling means hereinbefore described for regulating and controlling the revolution of the turbine 40, other supplemental means for the same purpose may be desirable. If so, a supplemental magnet 65 may be provided with its poles 66 and 67 located upon opposite sides of the flange or skirt 45 of the turbine.

Having thus described my invention, I claim:—

1. In a rotary gas meter, the combination of a turbine having a flange or skirt thereon, a device acting upon the said skirt for controlling the revolution of the said turbine, and a supplemental device for acting upon and controlling the speed of revolution of said turbine, a member of the said supplemental device having operative connection with said turbine.

2. In a rotary gas meter, the combination of a shaft, a turbine secured thereto and having a flange or skirt thereon and the said turbine being provided with means whereby the passage of a gas or similar fluid therethrough causes revolution thereof, a magnet acting upon the said skirt to retard the movement of revolution of the said turbine, and a supplemental device for retarding the movement of the said turbine, the said device comprising a magnet, an automatically movable cup-shaped device, and means for causing movement of the said cup-shaped device on rotation of the shaft to carry its edges into and out of the field of the said last-mentioned magnet, the said means and the said cup-shaped device being supported upon the said shaft.

In testimony that I claim the foregoing as my invention, I have hereunto signed my name this 15th day of January, A. D. 1910.

HOWARD A. SELAH.

In the presence of—
GEO. H. WEIDNER,
CARRIE E. KLEINFELDER.

---

Copies of this patent may be obtained for five cents each, by addressing the "Commissioner of Patents, Washington, D. C."